3,833,747
PROCESS FOR REDUCING THE HYGROSCOPICITY
OF DEHYDRATED FRUITS
James Cording, Jr., 420 Paoli Ave., Philadelphia, Pa.
19128, and Roderick K. Eskew, Box 205, Spring House,
Pa. 19477
No Drawing. Continuation-in-part of application Ser. No.
66,082, Aug. 21, 1970, which is a continuation-in-part
of application Ser. No. 662,193, Aug. 21, 1967, both
now abandoned. This application Aug. 7, 1972, Ser.
No. 278,661
Int. Cl. A23b 7/08, 7/10
U.S. Cl. 426—289    1 Claim

ABSTRACT OF THE DISCLOSURE

Dehydrated fruit of reduced hygroscopicity is obtained by removing from fruit pieces, by osmotic transfer or partial expression of the juice, natural hygroscopic monosaccharides, replacing the monosaccharides in a second osmotic transfer with a sugar such as sucrose, and then processing to provide dehydrated fruit pieces of porous structure. In the process of this invention, fruit acids removed with the monosaccharides are replaced by dry-coating the pieces after they are partially dried. Since the acid is put on the fruit and not into it, the acid has only very limited contact with the sugar and inversion does not occur, even after prolonged storage. Removing monosaccharides reduces or prevents caramelization during processing, improves rate of drying, and provides a markedly less hygroscopic porous dehydrated fruit product which is ideal as a snack type food.

---

A non-exclusive, irrevocable, royalty-free license in the invention herein described, throughout the world for all purposes of the United States Government, with the power to grant sublicenses for such purposes, is hereby granted to the Government of the United States of America.

This application is a continuation-in-part of application Ser. No. 66,082, filed Aug. 21, 1970, now abandoned, which is in turn a continuation-in-part of application Ser. No. 662,193, filed Aug. 21, 1967, now abandoned.

This invention relates to a process for reducing the hydroscopicity of dehydrated fruits, improving their processing characteristics and storage properties, and enhancing their flavor.

It is well known that certain fruits, for example apples, contain a high proportion of monosaccharides such as levulose and dextrose. When pieces of apple are dehydrated to a low moisture content, for example between about 1 and 5%, the presence of these sugars makes them highly hygroscopic and the pieces rapidly regain moisture in contact with a humid atmosphere. This attribute is highly objectionable, especially in the case of porous, crisp apple pieces such as can be produced by a number of means including freeze drying, microwave puffing and explosive puffing. The latter process is exemplified in U.S. Pat. 3,038,813. With moisture regain the pieces lose their crispness and become limp and unpalatable. Moreover, their hygroscopicity necessitates expensive moisture-impervious packaging materials and militates against their use in dry cereals or other dry materials.

In many other fruits and berries, for example peaches, plums, pears and strawberries, the hygroscopic monosaccharides are the predominating sugars and hence these fruits are hygroscopic in the dehydrated form. Moreover, the presence of these sugars impedes moisture removal and makes it virtually impossible in some cases to obtain a crisp dry product by conventional hot air drying. Consequently, to reduce the moisture content of these fruit pieces enough to obtain a crisp product, they must be treated by some means such as freeze-drying, vacuum drying, explosion-puffing or microwave heating to make their structure porous. Owing to their monosaccharide content, their low moisture content, and their porosity such dried products are prone to rapid moisture pickup. Freeze-dried products are especially susceptible since they are highly porous, having 80% or more voids.

It is also well known that monosaccharides are conducive to the development of "off-flavors" during storage of fruits and berries in dried form because of their predisposition to react with amino acids and other compounds.

Attempts to reduce the hygroscopicity of dehydrated fruits by the use of edible coatings have proven ineffectual or have altered the character and flavor of the fruit pieces.

We have now discovered a means of overcoming the undesirable attributes of fruits having a high monosaccharide content while preserving and in many cases improving the character and flavor of the fruits.

This is accomplished by the removal in whole or in part of the hygroscopic sugars and replacement of them with less hygroscopic sugars such as sucrose and processing to provide dehydrated fruit pieces of porous structure. The removal of the hygroscopic sugars is accomplished by osmosis or by partially expressing the juice, and replacement is accomplished by osmotic transfer. The removal of the sugar is generally also accompanied by loss of most of the fruit acids and some of the flavor components. Typically, the hygroscopic sugars are removed by immersing the fruit pieces in an aqueous medium containing a lower concentration of reducing sugars than the concentration of such sugars in the juice of the fruit. This will in general be water. It is obvious that in all cases, it is not necessary to completely remove the monosaccharides, it being sufficient only to reduce their level to a point where the residue will not impede dehydration, or make the final product undesirably hygroscopic. Nor is complete removal necessary if reduction is accomplished by expressing the juice. However, removal of the hygroscopic sugars requires more than a dip into water or into some other aqueous solution. As will be seen in the exemplification of our invention, three hours of leaching were required to reduce the monosaccharides from 10.68 gm. per 100 ml. of expressed juice to 2.6 gm. per 100 ml. of expressed juice.

Replacement of the extracted sugars may be done by soaking the extracted, drained pieces, or the pieces from which juice has been expressed, in an aqueous solution of sucrose or other sugar of low hygroscopicity, the concentration of the sugar in the soaking solution being higher than that of the sugars remaining in the pieces from which the original sugars were removed, in order to produce a difference in osmotic pressure.

In the process of this invention, about 90% of the fruit acids are removed from the fruit with the monosaccharides. When the monosaccharides have been replaced with sucrose and the fruit partially dried, the fruit is dry-coated with the desired acid. Since the acid is put on the fruit and not into it, the acid has only very limited contact with the sugar. Thus, the possibility of sucrose inversion is very slight. In fact, in our work, no sucrose inversion occurred even after prolonged storage. In addition, this method of replacing the fruit acids has another advantage, especially when the fruit is used as a snack. In this case, since the acid is on the surface, the fruit acid flavor is instantly apparent to the taste when one bites into the fruit piece. Acids such as malic, fumaric, adipic, succinic and other edible acids may be used.

Other components such as fruit essence or firming agents such as calcium salts may be replaced in the fruit by adding them to the soaking solution if desired. The flavor components may also be added to the finished dried product by holding the product in a tightly-closed container with the desired volatile flavors. For example, apple flavor can be restored by using a natural apple essence (volatile concentrate). Obviously, the essence should first be sufficiently concentrated so that the amount of water in the essence will not raise the moisture content of the final product appreciably.

Removing monosaccharides from fruits and berries reduces or prevents caramelization during processing, improves the rate of drying and provides a porous, dehydrated markedly less hygrocopic fruit product. The process of this invention should increase the utilization of fruits because it enables them to be kept in stable form and consequently to be used as snack items, as ingredients in dry breakfast cereals, as instant foods and in other palatable ways.

Another important feature of this invention is that after the partially dried fruit is treated to increase the porosity of its structure, the fruit is dehydrated to a moisture content of less than 2.0%. At this moisture level, the fruit is crisp in texture and non-hygroscopic in character and has good storage qualities. As the moisture level rises and especially when it gets above 5%, the fruit begins to lose its crispness and becomes unsuitable as a snack.

The invention is exemplified as follows:

Apples of the York Imperial variety, commonly used for processing, were peeled, cored, and cut into segments (16ths) along the axis of the core. These were halved transversely and dipped for 1 minute in an aqueous solution of ½% sodium bisulfite. The pieces were next passed over a slotted screen with openings about 5/16" wide by 2" long to remove small pieces. The pieces passing over the screen were then placed in a 2% sodium bisulfite solution, circulated, and held in it for 5 minutes.

The sulfited pieces were placed in water at 70° F.; 2 parts of water to 1 part of apple pieces, and leached with occasional stirring for a period of 3 hours. They were then removed from the water and drained for 15 minutes. An aqueous solution was prepared containing 40% sucrose by weight and the apple pieces from the previous operation were soaked in it for 2 hours. The ratio of the weight of solution to the weight of apple pieces was about 2 to 1. They were drained for 15 minutes and then dried in a through-circulation air drier at a dry bulb temperature of 180° F. until their moisture content was reduced to about 10%. The partially dried pieces were held for 24 hours in closed containers to equilibrate the moisture within and among the pieces. They were then tumbled with 2.4% of fumaric acid, based on apple solids, to coat them before subjecting them to the puffing process.

The coated pieces were placed in a puffing gun (as described in the Department of Agriculture publication "ARS 73–49—Explosion Puffed Dehydrated Carrots. III. Estimated Cost of Commercial Production Using Shortened Cycle") where they were heated while the gun was rotated to raise the temperature of their contained water above its atmospheric boiling point. This was accomplished by passing superheated steam at about 320° F. and 25 p.s.i.g. pressure through them for about 1 minute while maintaining the gun wall temperature at 320° F. by means of an external gas flame. At the end of 1 minute period, the gun lid was instantly opened and the pieces discharged explosively. At this stage the pieces were porous and plump with respect to their size when charged to the gun.

To make them crisp, the pieces were then dried in a through-circulation air drier at a dry bulb temperature of 150° F. until their moisture content had been reduced to 1.5%. When placed in an atmosphere of 75% relative humidity and 90° F., the pieces remained crisp for a period of 4 to 5 times as long as pieces which had not been treated to substitute sucrose for reducing sugars.

The following data show the extent to which the total monosaccharides (dextrose and levulose) and acid were removed and replaced in the process of this example.

|  | Percent moisture | Monosaccharides | Sucrose | Acid |
| --- | --- | --- | --- | --- |
| Before leaching | 84 | *10.68 | *2.48 | *0.56 |
| After leaching | 94.6 | *2.6 | *0.53 | *0.09 |
| After soaking | 79.5 | *1.98 | *17.75 | *0.05 |
| Finished product | 1.88 | **4.07 | **10.25 | *0.30 |

*Grams per 100 ml. of expressed juice.
**Grams per 100 ml. of juice expressed from pieces rehydrated to 85% moisture.

These data show that the percentage of the total sugars represented by monosaccharides was reduced from about 81% to about 10% in the soaked product and less than 29% in the reconstituted dried product.

The dried product, when placed in an atmosphere of 75% relative humidity and 90° F. remained crisp for a period of 4 to 5 times as long as pieces which had not been treated to substitute sucrose for their reducing sugars. Moreover, after continued storage for more than 6 months there was no inversion of the sucrose.

The data also show that after leaching and soaking 91% of the fruit acid had been removed.

We claim:

1. In a process for preparing dehydrated fruit of low hygroscopicity wherein monosaccharides and fruit acids are removed from the fruit by leaching and replaced by sucrose and edible acids, the fruit partially dried to a moisture content of about 10%, the partially dried fruit explosively puffed to increase the porosity of its structure, and the explosively puffed product dehydrated, the improvements which consist of leaching from the fruit, prior to said soaking and said partial drying of the fruit, at least 80% of the monosaccharides and at least 90% of the fruit acids, and by applying, immediately prior to the step of explosively puffing to increase the porosity of the fruit structure, an edible acid in dry form selected from the group consisting of malic, fumaric, adipic and succinic to the surface of the partially dried fruit thereby minimizing contact between the sucrose and the added acid.

References Cited

UNITED STATES PATENTS

| 1,009,325 | 11/1911 | Lodge | 99—102 |
| 1,631,017 | 5/1927 | Crawford | 99—102 |
| 2,821,477 | 1/1958 | Forkner | 99—103 |
| 2,834,681 | 5/1958 | Kreager | 99—102 |
| 3,113,031 | 12/1963 | Stanley | 99—103 |
| 3,281,251 | 10/1966 | Templeton | 99—204 |
| 3,365,309 | 1/1968 | Dader | 99—204 |
| 3,408,209 | 10/1968 | Eskew | 99—204 |
| 3,409,447 | 11/1968 | Jyrpson | 99—217 |
| 3,482,995 | 12/1969 | Houi | 99—102 |

WILBUR L. BASCOMB, JR., Primary Examiner

M. G. MULLEN, Assistant Examiner

U.S. Cl. X.R.

426—295, 351, 378, 380, 447, 456, 465

UNITED STATES PATENT OFFICE
CERTIFICATE OF CORRECTION

PATENT NO. : 3,833,747
DATED : September 3, 1974
INVENTOR(S) : James Cording, Jr. and Roderick K. Eskew It is certified that error appears in the above-identified patent and that said Letters Patent are hereby corrected as shown below:

The following statement should appear in the heading in col. 1:

Assignee: The United States of America, as represented by the Secretary of Agriculture.

Signed and Sealed this twenty-first Day of October 1975

[SEAL]

Attest:

RUTH C. MASON
*Attesting Officer*

C. MARSHALL DANN
*Commissioner of Patents and Trademarks*